(12) United States Patent
Vincent

(10) Patent No.: US 6,732,622 B2
(45) Date of Patent: May 11, 2004

(54) SAFETY MANUAL VEGETABLE CUTTER

(75) Inventor: Jacques Vincent, Vagney (FR)

(73) Assignee: DeBuyer, LeVal d'Ajol (FR)

( * ) Notice: Subject to any disclaimer, the term of this patent is extended or adjusted under 35 U.S.C. 154(b) by 133 days.

(21) Appl. No.: 09/956,407

(22) Filed: Sep. 19, 2001

(65) Prior Publication Data

US 2002/0174754 A1 Nov. 28, 2002

(30) Foreign Application Priority Data

May 28, 2001 (FR) .............................. 01 06922

(51) Int. Cl.⁷ .............................. B26D 3/26; B26D 1/02; B26B 3/00
(52) U.S. Cl. .............................. 83/247; 83/932; 83/856; 83/858; 83/425.3; 83/431; 83/717; 83/441.1; 83/435.15; 83/437.7; 83/697; 83/698.1; 83/954; 30/276.6; 30/280; 99/537
(58) Field of Search .............................. 83/703, 704, 707, 83/708, 422, 431, 435.12, 435.15, 437.7, 441.1, 717, 657, 856, 857, 858, 932, 852, 247, 425.3, 698.11, 554; 30/278, 280, 279.6, 283, 286, 287, 289, 290, 291; 99/537

(56) References Cited

U.S. PATENT DOCUMENTS

| | | | | | |
|---|---|---|---|---|---|
| 236,038 | A | * | 12/1880 | Keiter | 83/396 |
| 291,305 | A | * | 1/1884 | Dames | 83/865 |
| 377,909 | A | * | 2/1888 | Ponath | 83/717 |
| 773,769 | A | * | 11/1904 | Thompson | 83/699.51 |
| 1,768,072 | A | * | 6/1930 | Keeton | 83/144 |
| 1,974,194 | A | * | 9/1934 | Phillips | 241/101.1 |
| 2,273,969 | A | | 2/1942 | Linenfelser | 146/171 |
| 2,583,595 | A | * | 1/1952 | Rodel et al. | 83/145 |
| 2,766,793 | A | * | 10/1956 | Duszynski | 83/699.51 |
| 4,038,892 | A | | 8/1977 | Popeil | 83/4 |
| 5,745,999 | A | | 5/1998 | Zirkiev | 30/278 |
| 5,765,472 | A | * | 6/1998 | Kim | 99/537 |

FOREIGN PATENT DOCUMENTS

| | | | |
|---|---|---|---|
| DE | 3642704 A1 | 6/1988 | |
| EP | 0196550 A1 | 10/1986 | |
| FR | 1528906 | 6/1968 | B26D/4/42 |
| FR | 1534674 | 8/1968 | B26D/4/42 |
| GB | 486118 | 5/1938 | |
| GB | 769156 | 2/1957 | |
| GB | 2032260 A | 5/1980 | B26D/4/42 |

* cited by examiner

Primary Examiner—Boyer D. Ashley
(74) Attorney, Agent, or Firm—Drinker Biddle & Reath LLP

(57) ABSTRACT

The present invention relates to a manual vegetable cutter, for selectively varied cutting. Furthermore, the cutter of the present invention does not expose the user to risks of serious cuts. The cutter comprises a frame fitted with at least one cutting blade mounted transversely facing a slot through which the cut vegetables pass and also two side rails providing guidance in to and fro translational motion for a guide chamber equipped with a loading volume for the vegetables to be cut up and acting in conjunction with a press-down cap which the user grips in order to move the guide chamber to and fro along the guide rails while constantly exerting pressure on the vegetables contained in the loading volume so that they are pressed against the cutting blade or blades fitted to the frame and can be cut up by the blade or blades.

15 Claims, 15 Drawing Sheets

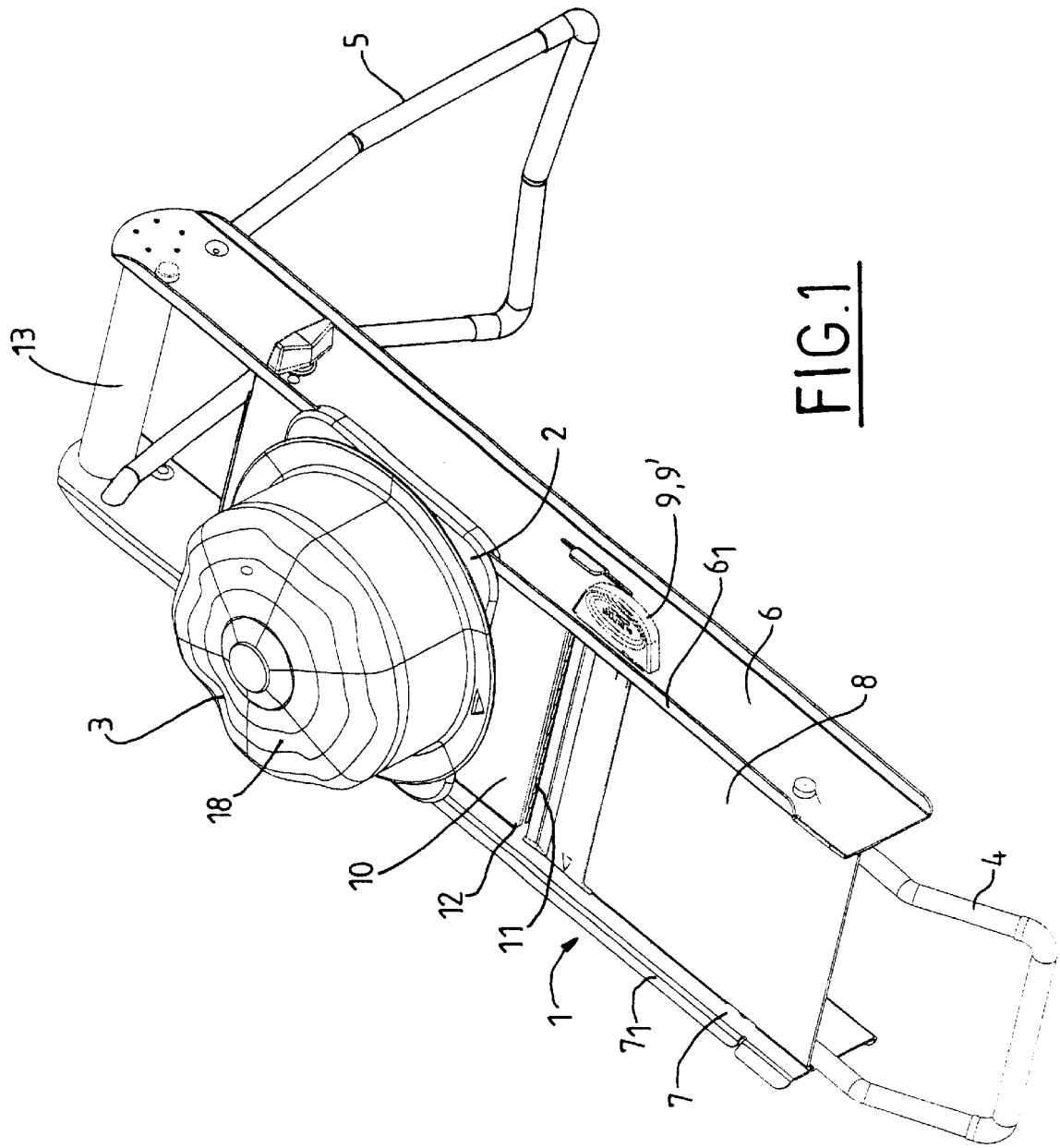

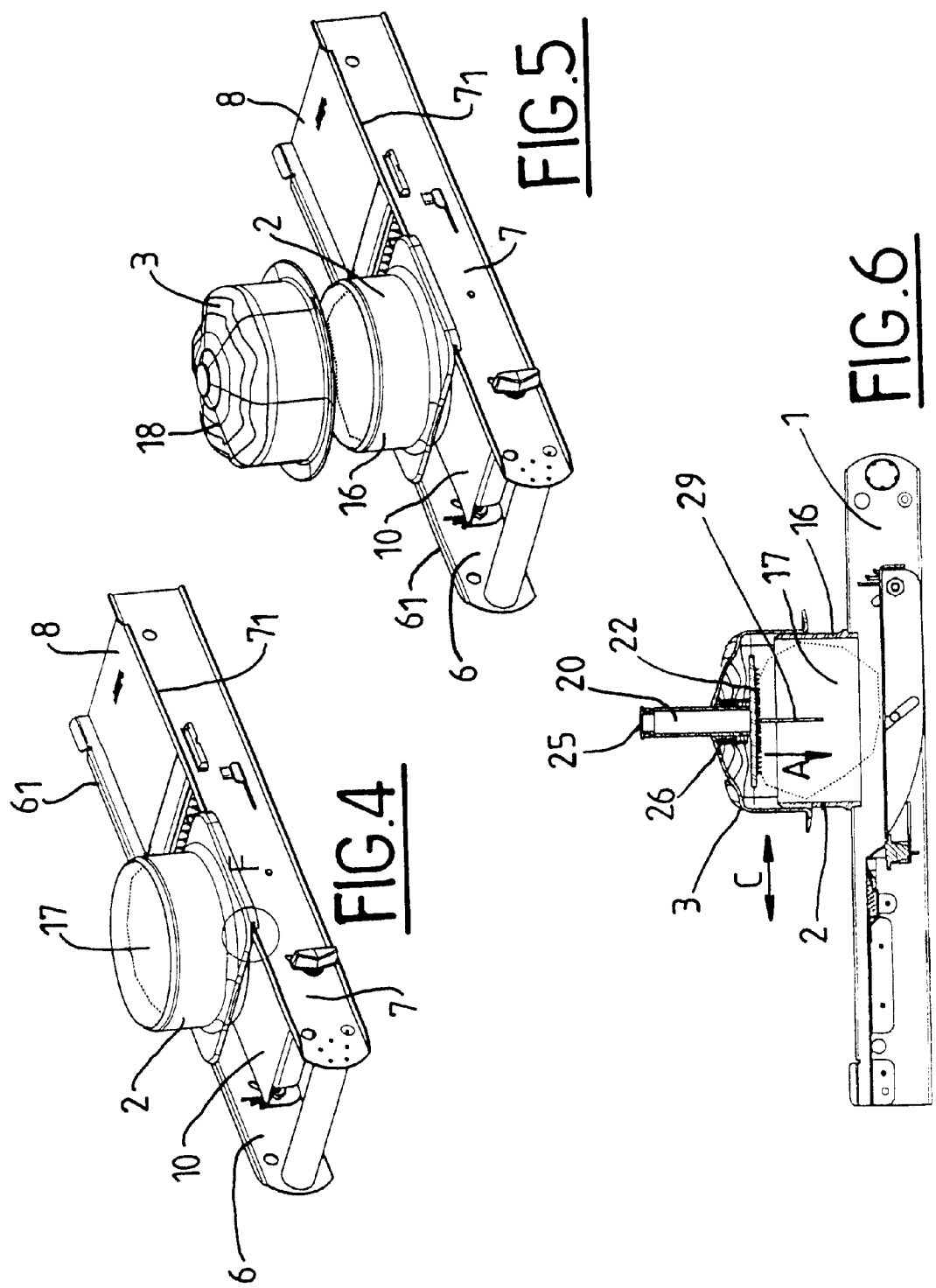

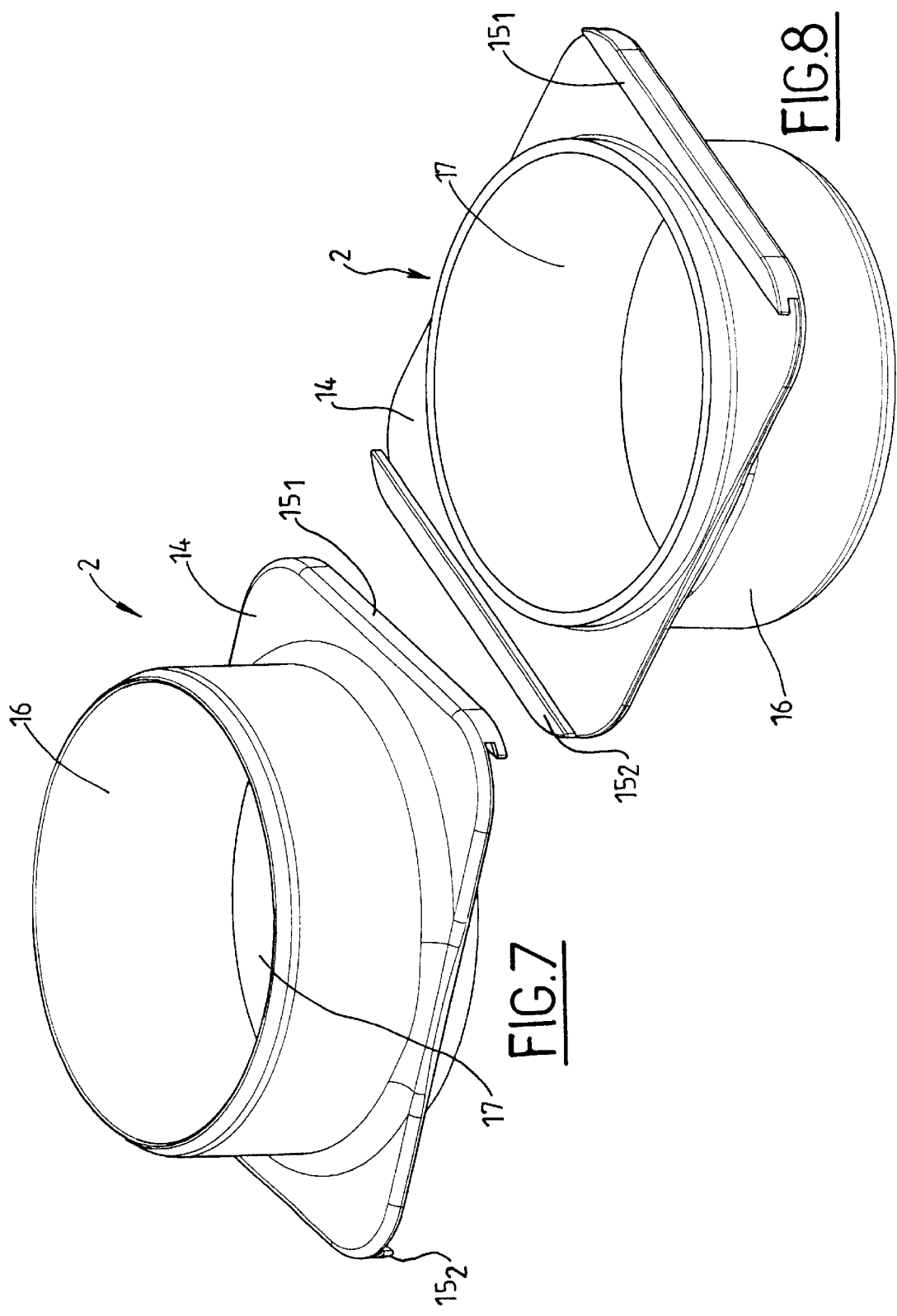

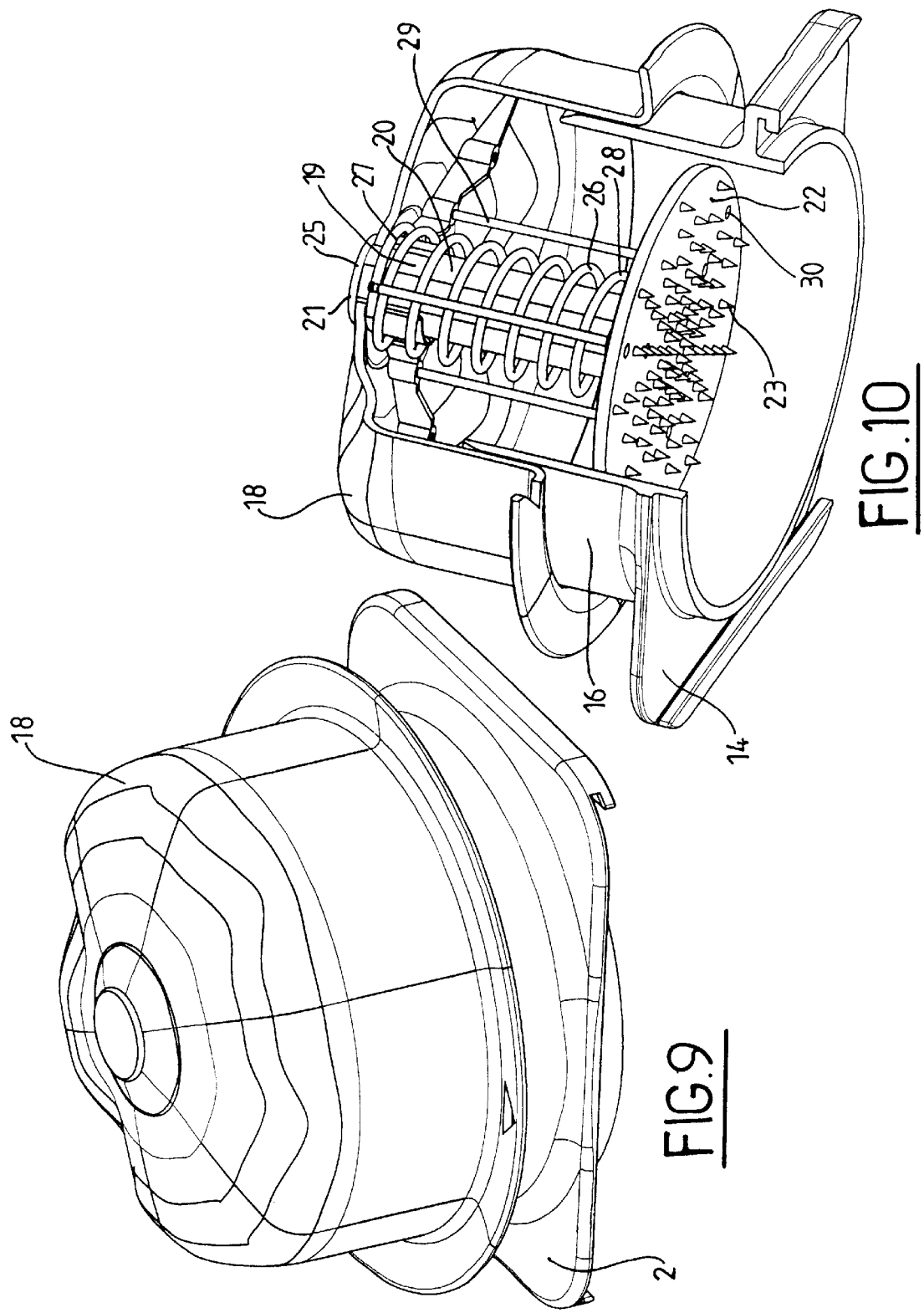

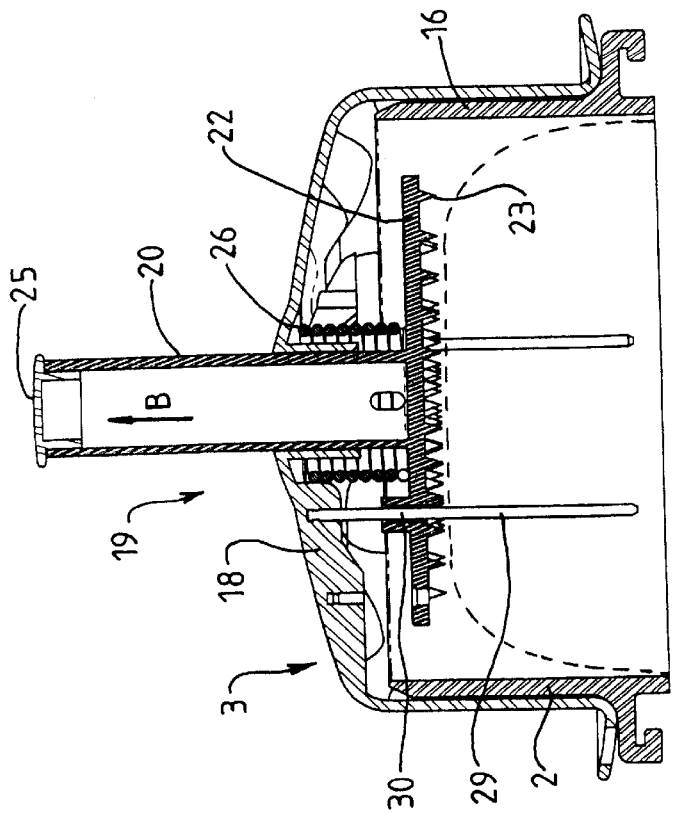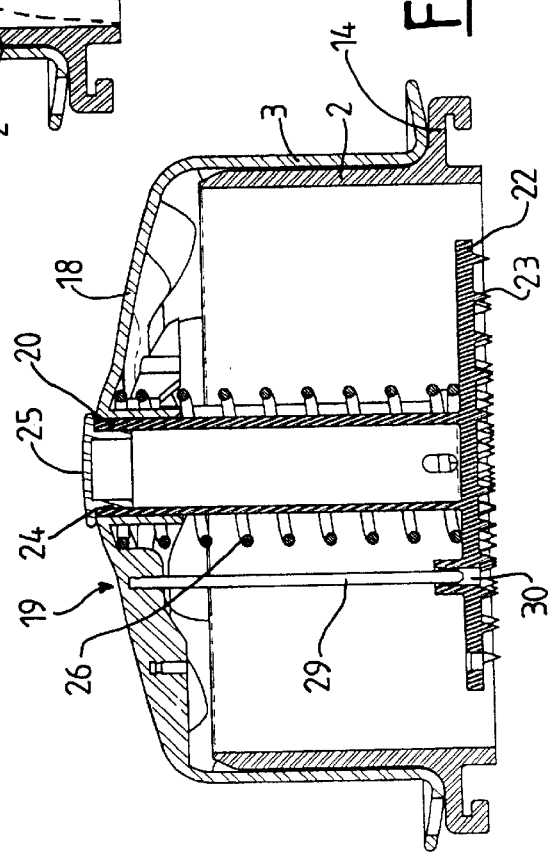

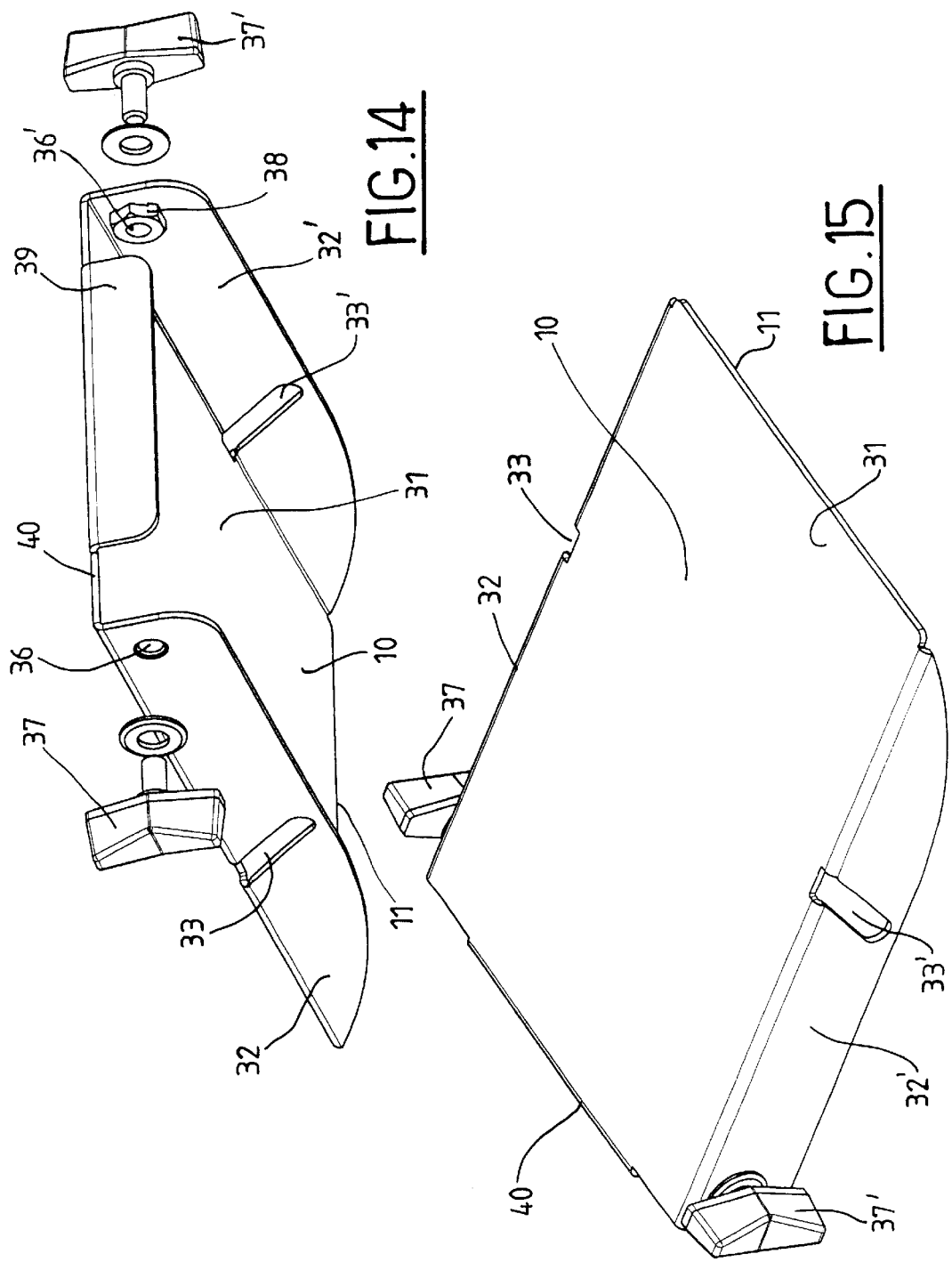

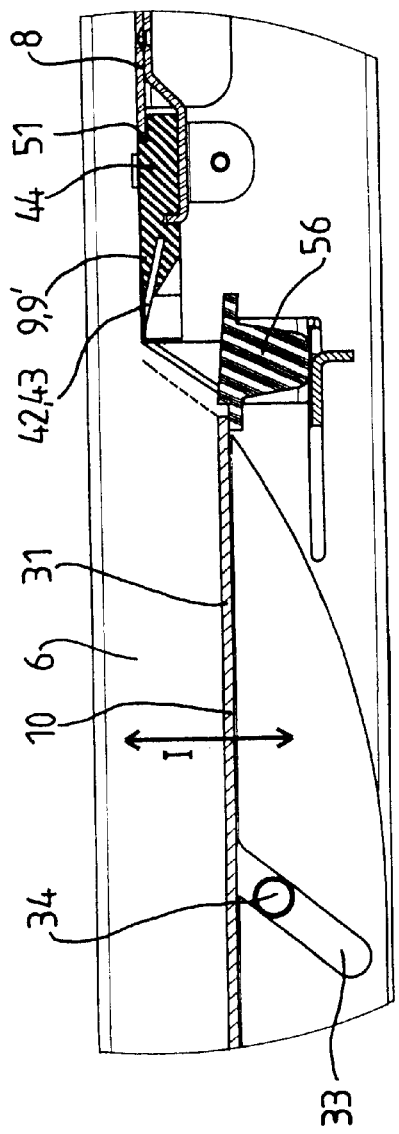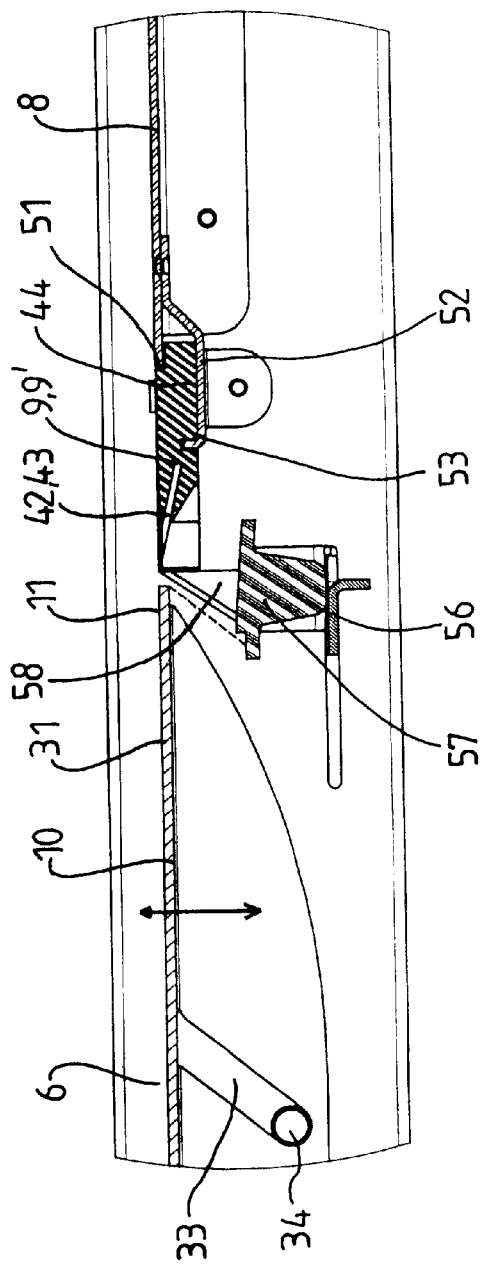

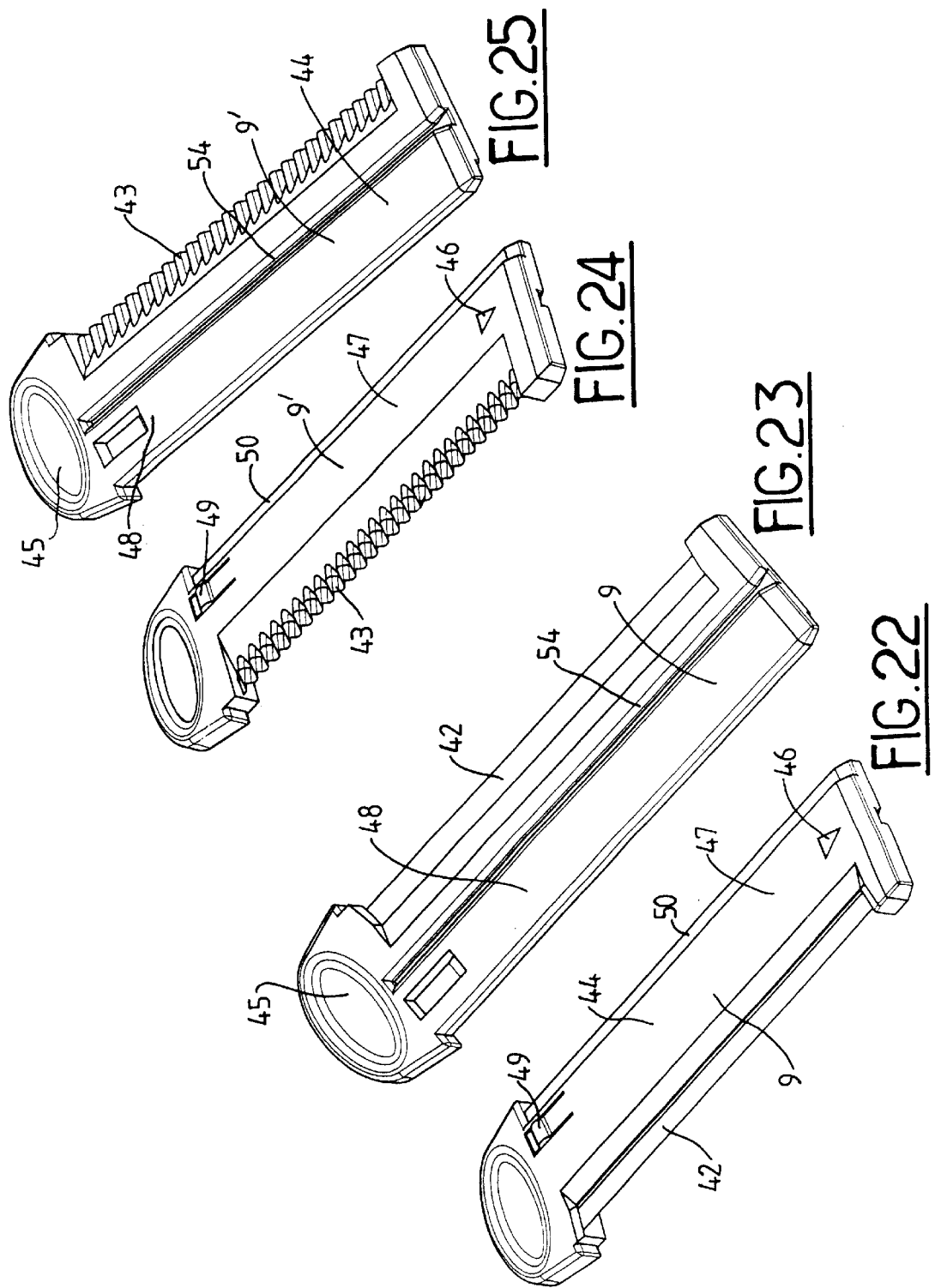

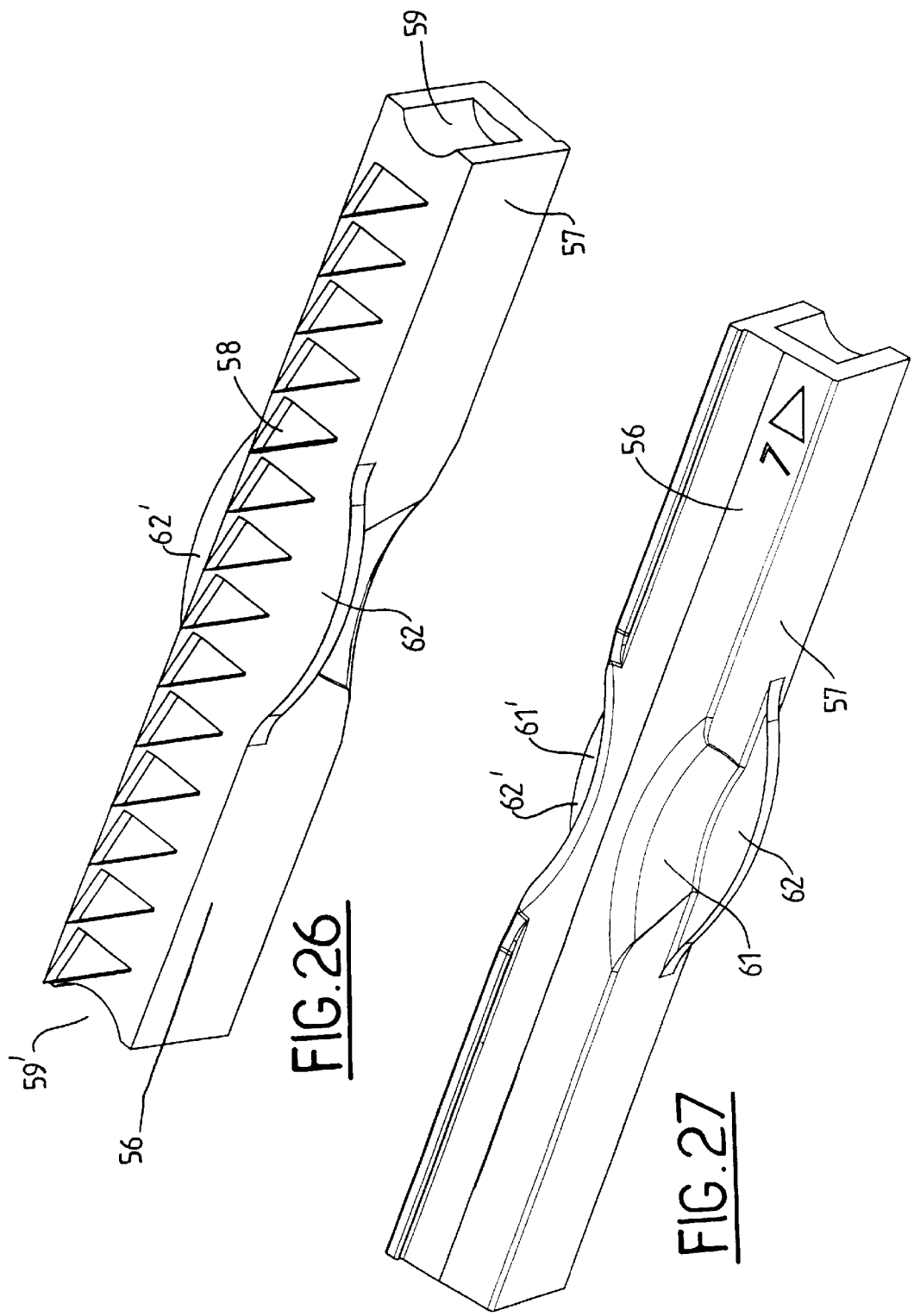

SAFETY MANUAL VEGETABLE CUTTER

CROSS REFERENCE TO RELATED APPLICATION

This application claims the benefit of French Patent Application No, 01 06 922, Filed May 28, 2001

FIELD OF THE INVENTION

The subject of this invention is a safety manual vegetable cutter for domestic and professional use.

BACKGROUND OF THE INVENTION

There are currently different types of manual vegetable cutters on the market, none of them very practical and all of them exposing their users to serious risks of cuts.

At the same time, there are also numerous electric vegetable slicers or food processors for household use or designed for use in industry or collectives, these being multi-purpose machines. However, they are generally-sophisticated appliances which, apart from their high cost, often have the disadvantage of being inconvenient to use and also difficult to assemble and clean.

So far, users have never been offered simple, practical and inexpensive manual vegetable cutters, allowing the cutting characteristics to be varied selectively and also not exposing the user to risks of serious cuts.

The invention is intended to fill this gap.

BRIEF SUMMARY OF THE INVENTION

To achieve this, the invention proposes a safety manual vegetable cutter, in broad terms substantially metal, characterised in that it comprises a frame fitted with at least one cutting blade mounted transversely facing a slot through which the cut vegetables pass and also two side rails providing guidance in to and fro translational motion for a guide chamber equipped with a loading volume for the vegetables to be cut up and Given this configuration, the to-and-fro motion of the guide chamber along the frame enables vegetables inserted into the loading volume to be cut into slices automatically.

Of course, in connection with the invention, the term "vegetables" must be considered in a very broad sense, and the vegetables cut up may be not only vegetables of all kinds in the strict sense (potatoes, cucumbers, carrots etc.) but also fruits or other foodstuffs suitable for slicing.

According to a preferred characteristic of the invention, the press-down cap has a hollow ergonomic body fitting over the guide chamber so as to form a carriage assembly integral in translation with the frame and also an extractor consisting of an extractor rod capable of translational motion on the inside of the ergonomic press-down cap body, and having a first end extending beyond this press-down cap body through a guide opening made in it, and also by a plate transmitting feed pressure preferably fitted with spikes on its outer face.

According to the invention, this feed plate is secured to the second end of the extractor rod to allow the vegetables for slicing to be pressed against the cutting blade or blades fitted to the frame when the carriage is moved.

When the ergonomic press-down cap body is fitted over the guide chamber, it is able to slide on it.

The cross-section of the extractor rod and also the guide opening are preferably not free to rotate and are dimensioned so as to prevent rotation of the extractor relative to the ergonomic press-down cap body.

According to the invention, the first outward-projecting end of the extractor rod is fitted with a removable plug with a diameter larger than the diameter of the guide opening so as to allow the extractor to remain constantly integral with the ergonomic press-down cap body.

According to another preferred characteristic of the invention, the press-down cap has a spring fitted around the extractor rod with one of its ends or first end bearing against the ergonomic press-down cap body on the inside of the latter and also its opposite end or second end bearing against the feed pressure plate.

This spring tends to press the feed plate against the frame in the absence of any external force being applied to it.

According to another characteristic of the invention, the ergonomic press-down cap body is equipped with needles attached to the inside of it and intended to be pushed into the vegetables to be cut up, so as to prevent them rolling in the guide chamber.

After the ergonomic press-down cap body is fitted onto the guide chamber, the extractor comes to bear against the vegetables which have previously been put into the loading volume.

When the user then applies pressure to the ergonomic press-down cap body, the latter slides along the guide chamber and moves nearer to the frame.

In the course of this movement, the extractor rod rises progressively outwards, compressing the spring, and the needles are pressed into the vegetables.

This movement continues until the spring is compressed completely.

The length of the extractor rod which then projects beyond the ergonomic press-down cap body through the guide opening indicates to the user the quantity of vegetables present in the loading volume of the guide chamber.

From this position, the user can cut up the vegetables by manoeuvring the ergonomic press-down cap body so as to move it to and fro along the frame, so that the level of vegetables is constantly lowered.

In fact, the spring constantly applies pressure to the extractor which forces the vegetables towards the cutting blade or blades fitted to the frame so that they can be sliced.

As the slicing proceeds, the needles are released from the vegetables.

According to the invention, the vegetable cutter is dimensioned so that when the cutting is finished, the ergonomic press-down cap body is resting against the guide chamber and the extractor cannot move down to the level of the cutting blades because the length of the extractor rod is chosen such that the plug causes its translational motion to be halted.

It should be noted that the assembly thus constituted can be completely dismantled by means of the plug which, when removed, allows the extractor to be taken out of the press-down cap by releasing the spring so that the user can thus clean the unit thoroughly.

According to another characteristic of the invention, the frame has two parallel side uprights connected by a transverse operating handle and forming the guide rails of the carriage.

According to a preferred characteristic of the invention, the vegetable cutter comprises means for adjusting the depth of cut and therefore the thickness of the slices cut.

These means advantageously include a ramp, capable of translational motion, fitted parallel to the cutting plane and facing the cutting blade or blades at one of its ends or first end to form the slot through which the sliced vegetables pass.

It is also advantageous in accordance with the invention to provide means for keeping the first end of the cutting depth adjustment ramp at a constant short distance from the cutting blade or blades.

According to the invention, when the vegetable cutter is operated, the cutting depth adjustment ramp is of course locked with respect to the side uprights of the frame and the user holds the ergonomic press-down cap body with one hand to move the carriage assembly to and fro along the frame while exerting pressure on the press-down cap body, and also holds the transverse operating handle of the frame with the other hand to steady the appliance.

According to the invention, the cutting depth adjustment ramp may advantageously be constituted by a central plate acting in conjunction with the transverse blade or blades and, by means of side flanges, locating it between the side uprights of the frame.

To achieve this, the uprights may be fitted on their inner faces with studs engaging in oblong holes in the side flanges of the ramp.

These studs and oblong holes may also act in conjunction with identical oblong holes made in the side uprights of the frame with locking components integral with the ramp passing through them.

When they are loosened and not providing locking to prevent movement, these locking components also act as guide studs so as to allow translational motion of the cutting depth adjustment ramp with respect to the side uprights of the frame.

The holes provided in the flanges of the cutting depth adjustment ramp and also in the side uprights of the frame are preferably inclined obliquely so that the translational motion takes place in both directions, up and down and backwards and forwards.

It is thus possible to keep the cutting depth adjustment ramp constantly parallel to itself and consequently to adjust the depth of cut while ensuring that the first end of the ramp remains at a constant and very short distance from the cutting blade or blades.

Such a configuration means that the cut can be optimised both because of the short distance between the ramp and blade(s) as they pass each other, which ensures optimum regularity and accuracy, and also because there is no variation in height during translational motion of the vegetables towards the cutting blade or blades; this arrangement avoids any phenomenon of thinning at the end of the cut such as might be observed if the cutting depth adjustment ramp, instead of being made to move in translation parallel to the cutting plane, was able to move in rotation about an axis integral with the frame at its second end opposite the first end located facing the cutting blade or blades.

According to the invention, cutting depth adjustment can advantageously be achieved by operating a hand grip provided for the purpose at the rear of the ramp.

The distance between the transverse operating handle and the hand grip is preferably arranged to allow movement of the fingers so that the user can push ox pull the cutting depth adjustment ramp with the hand which is holding the transverse operating handle.

All that needs to be done then is to lock the adjustment using the locking components.

It should be noted that the side uprights of the frame can advantageously be equipped with markings to show this adjustment and therefore to indicate to the user the thickness of the slices cut.

According to another characteristic of the invention, the guide chamber is made integral with the frame by means of slides preferably of a man-made material, particularly polycarbonate.

The function of these slides is to exclude any risk of seizure resulting from metal to metal friction and therefore to allow the guide chamber to slide easily, smoothly and silently along the frame.

Fitting the guide chamber so that it is integral with the frame represents a particularly advantageous characteristic of the invention since it eliminates any danger of the guide chamber accidentally coming off its guide rails during use, and consequently causing injury to the user.

According to the invention, the loading volume of the guide chamber may advantageously be cylindrical in shape and of relatively large size (particularly a diameter of the order of 50 to 150 mm for a height of the order of 10 to 80 mm) to allow professional use.

Of course, a loading volume of the guide chamber of the kind described acts in conjunction with an ergonomic press-down cap body which is also substantially cylindrical inside and a feed plate forming a press-down device constituted by a disc.

According to another characteristic of the invention, the vegetable cutter rests on at least one foot, preferably folding.

The frame can advantageously be mounted on two folding trapezoidal feet, namely a front foot and a rear foot, substantially U-shaped.

The front foot raises the front of the frame, that is to say the end opposite the transverse operating handle to allow a dish to be slid under it and filled up; a substantially larger volume of vegetables can thus be sliced.

The rear foot allows the vegetable cutter to be used over a container such as a basin, using it as a support; the support thus obtained is stable and consequently makes for safe use of the vegetable cutter. Resting the vegetable cutter on the front foot and on the rear foot enables a convenient working angle to be obtained.

According to another characteristic of the invention, the vegetable cutter comprises at least two removable and interchangeable transverse blades capable of being selectively positioned and snapped into place in the frame.

One of these blades is preferably equipped with a straight cutting edge while the other is equipped with a corrugated cutting edge, with various possible shapes.

The blades having a straight cutting edge and the blades having a corrugated cutting edge can be selectively fitted in the cutting position facing the slot through which the cut vegetables pass, depending on whether smooth slices or ridged slices are required.

According to the invention, the transverse blades are composed of a body of a man-made or metal material in which the cutting portion is inserted.

The body of each transverse blade may advantageously include a mark which the user will also find on the frame when fitting the blades so as to ensure that they are inserted in the right direction and on the right side of the cutting portions.

According to another characteristic of the invention, the vegetable cutter comprises at least one removable lengthwise cutter blade fitted with a set of equidistant blades aligned substantially at right angles to the transverse blades so that the vegetables can be cut into sticks.

The vegetable cutter may advantageously be equipped with a series of such cutting knives where the blades are a greater or smaller distance apart so that larger or smaller sticks can be obtained.

According to the invention, the cutter blade is preferably snapped into place in the frame between the side uprights of the frame, in particular by means of projections and corresponding recesses.

It is particularly advantageous for these projections and these recesses to be asymmetrical to ensure that the blade is always fitted the right way round. The ergonomic shape of the press-down cap body provides a good grip for installing it without risk of injury.

It is also advantageous to equip the vegetable cutter with a bar for locking the cutting blade after it is fitted into the frame.

BRIEF DESCRIPTION OF THE DRAWINGS

The characteristics of the vegetable cutter which is the subject of the invention will be described in more detail with reference to the attached drawings in which:

FIG. 1 is a perspective view of the vegetable cutter

FIG. 4 is a perspective view of the frame fitted with the guide chamber

FIG. 5 is a perspective view corresponding to FIG. 4 when the press-down cap is fitted FIG. 6 is a sectional view of the vegetable cutter fitted with the complete carriage in action on the vegetables to be sliced FIG. 7 is a perspective view showing the upper part of the guide chamber FIG. 8 is a perspective view showing the lower part of the guide chamber FIG. 9 is a perspective view showing the press-down cap fitted onto the guide chamber FIGS. 10 and 11 are cutaway views of the whole of the carriage FIG. 12 is a sectional view of the carriage with the press-down cap shown in the down position FIG. 13 is a sectional view of the carriage with the fitted press-down cap shown in the up position FIG. 14 is a perspective view of the cutting depth adjustment ramp showing the lower part of the ramp FIG. 15 is a perspective view of the cutting depth adjustment ramp showing the upper part of the ramp

FIG. 20 is a detail view corresponding to FIG. 18

FIG. 21 is a detail view corresponding to FIG. 19

FIG. 22 is a perspective view of one of the faces of a transverse blade having a straight cutting edge FIG. 23 is a view similar to FIG. 22 showing the other face of this transverse blade having a straight cutting edge FIG. 24 is a perspective view of one of the faces of a transverse blade having a corrugated cutting edge FIG. 25 is a perspective view corresponding to FIG. 24 and showing the other face of the transverse blade having a corrugated cutting edge FIG. 26 is a perspective view showing one of the faces of a cutter blade FIG. 27 is a perspective view similar to FIG. 26 and showing the other face of the cutter blade

DETAILED DESCRIPTION OF THE DRAWINGS

As shown in FIG. 1, the vegetable cutter consists of a frame 1 shown in detail in FIGS. 2, 3, 16 and 17 and also of a carriage assembly consisting of a guide chamber 2 and a press-down 3 cap capable of translational motion to and fro along this frame 1.

The guide chamber 2 is shown in detail in FIGS. 4, 5, 7 and 8 while the press-down cap 3 is shown in detail in FIGS. 6, 9, 10, 11, 12 and 13.

Figure 3:
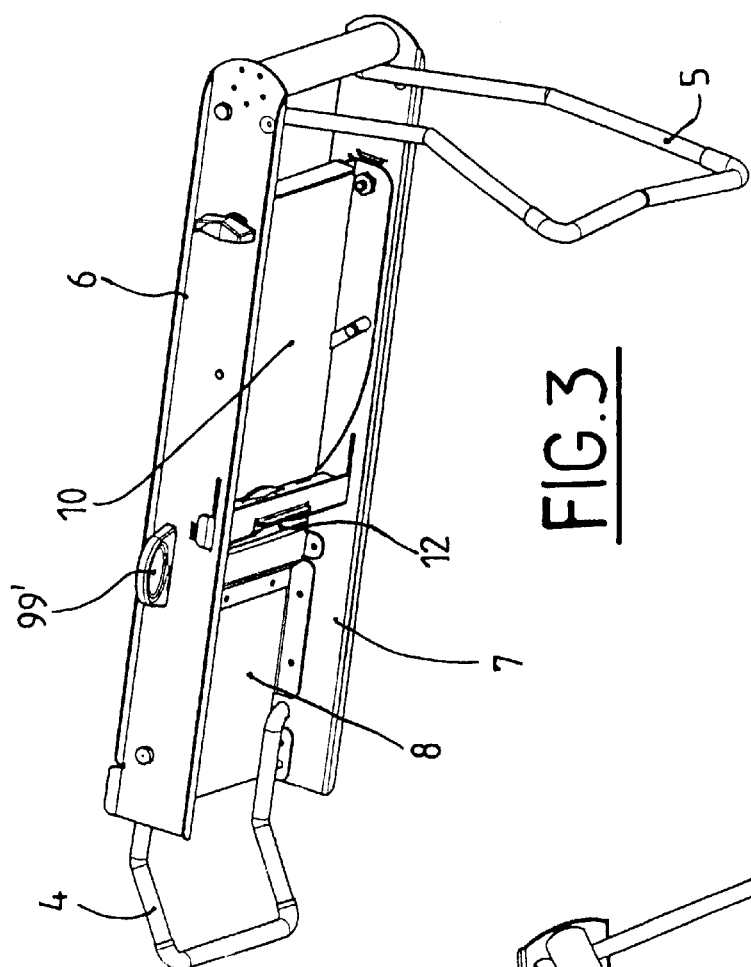
FIG. 3 is a perspective view of the frame showing the lower part of the frame
Figure 2:
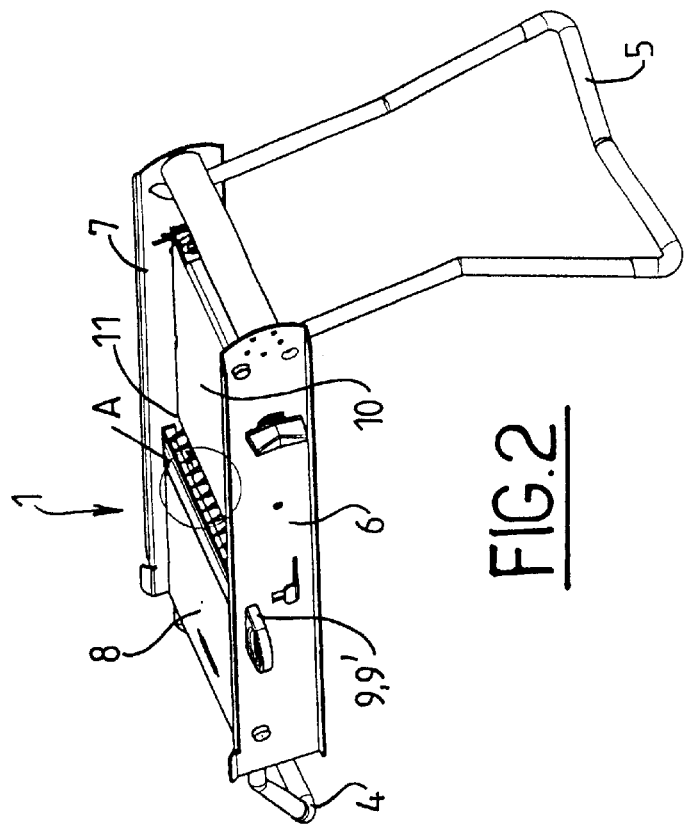
FIG. 2 is a perspective view of the frame showing the upper part of the frame

As shown in FIGS. 1, 2 and 3, the frame 1 is mounted on two trapezoidal feet, substantially U-shaped, namely a front foot 4 and a rear foot 5.

The frame 1 consists mainly of two parallel side uprights 6, 7 linked by a transverse operating handle 13, and by a spacer 8 on which a transverse cutting blade 9, 9' slides in a manner which will be described in more detail later in this presentation and also a cutting depth adjustment ramp 10, a first end 11 of which is positioned facing the cutting blade 9, 9' so as to form a slot 12 through which the sliced vegetables pass.

The configuration of the cutting height adjustment ramp 10 will also be described in more detail later in this presentation with reference to FIGS. 14 to 21.

As shown in FIGS. 1, 4 and 5, the upper edges $6_1$, $7_1$, opposite the feet 4, 5 of the side uprights 6, 7 of the frame 1, form two guide rails for the guide chamber 2.

As shown in FIGS. 7 and 8, the guide chamber 2 consists of a substantially rectangular chamber body 14, having two opposite edges turned down to form two slides $15_1$, $15_2$, substantially U-shaped in section which act in conjunction with the guide rails $7_1$, $7_2$, and also of a cylindrical wall 16, the inside of which forms the boundary of a loading chamber 17, open at either end, holding the vegetables to be cut up, shown by dotted lines in FIG. 6.

As shown in FIGS. 9 to 13, the press-down cap 3 consists mainly of an extractor 19 and a hollow ergonomic press-down cap body 18 fitting onto the cylindrical surface 16 of the guide chamber 2 so as to form a carriage assembly integral with the frame and able to move in translation, as shown in particular in FIG. 6.

Figure 11:
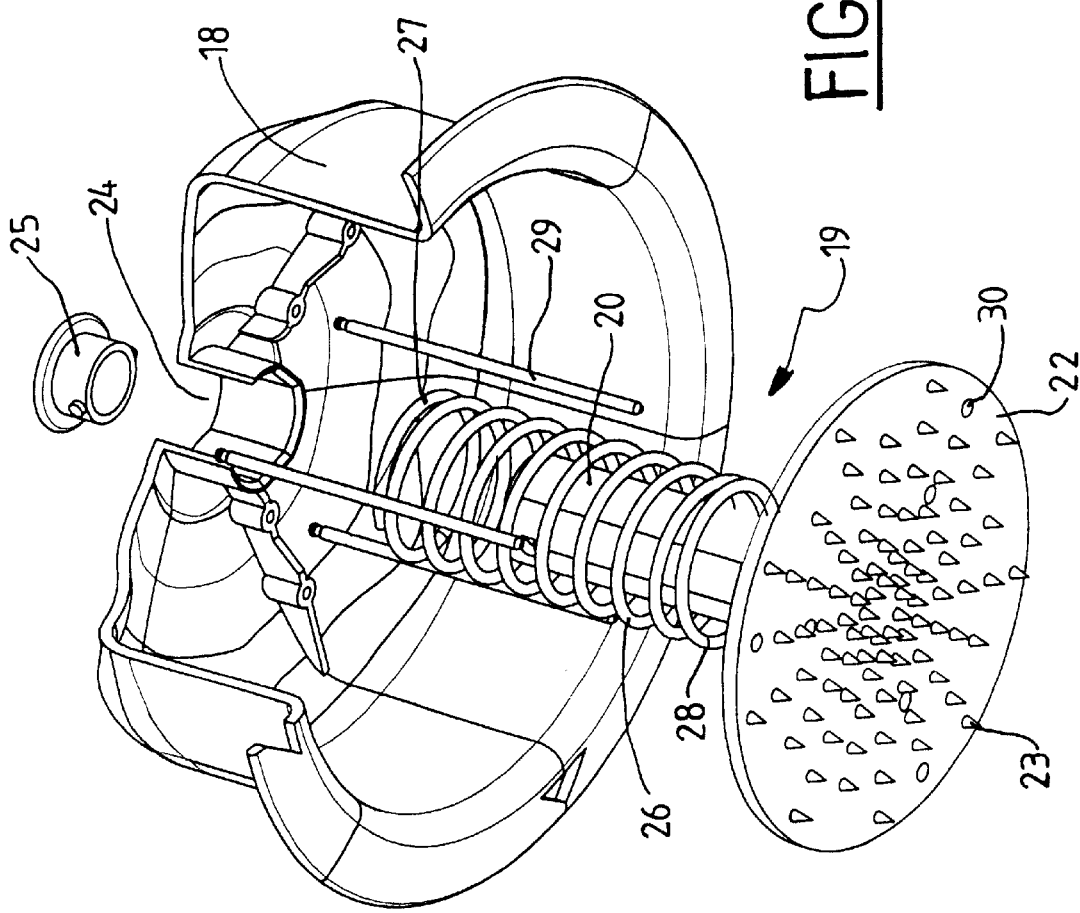

As FIGS. 10 and 11 show, the extractor 19 consists of an extractor rod 20 which is not free to rotate, carrying at one of its ends a disc transmitting feed pressure 22 fitted with spikes 23.

The end 21 of the extractor rod 20 opposite the disc transmitting feed pressure 22 projects from the ergonomic press-down cap body 18 through a guide opening 24 which is not rotationally symmetrical either, made for this purpose in the central part of the ergonomic press-down cap body 18.

A removable plug 25 shown more precisely in FIG. 11 is fitted onto the end 21 of the extractor rod 20 to allow the extractor 19 to remain constantly integral with the ergonomic press-down cap body 18.

Moreover, as shown in FIGS. 10 and 11, the extractor 19 is equipped with a spring 26 which is fitted around the extractor rod 20 and bears against the inner face of the ergonomic press-down cap body 18 at one of its ends 27 and also against the disc transmitting feed pressure 22 at its opposite end 28.

As shown in FIG. 6, the spring 26 tends to press the disc transmitting feed pressure 22 against the frame 1 in the absence of any external force exerted on it.

As shown in FIGS. 10 and 11, the ergonomic press-down cap body 18 is also equipped on the inside with needles 29 designed to be pressed into the vegetables to be sliced (FIG. 6).

As shown in FIG. 4, when the user wishes to use the vegetable cutter, the first operation consists in inserting vegetables to be sliced, shown in dotted lines, in the loading volume 17 of the guide chamber 2.

After the vegetables are inserted, the user must fit the ergonomic press-down cap body 18 onto the cylindrical surface 16 of the guide chamber 2 as shown in FIG. 5.

Prior to this fitting operation, the extractor 19 is in a rest position shown in FIG. 12 in which the plug 25 is bearing against the outer periphery of the guide opening 24 in the ergonomic press-down cap body 18.

When the fitting operation is carried out, the disc transmitting feed pressure 22 comes up against the vegetables contained in the loading volume 17 and the spikes on this disc 23 press into the flesh of these vegetables to hold them.

When the disc is pressing on the vegetables, the user must apply pressure to the ergonomic press-down cap body 18 to make it slide along the cylindrical wall 16 of the guide chamber 2 in the direction of arrow A (FIG. 6).

As shown in FIG. 13, the needles 29 then enter the openings 30 made for this purpose through the disc transmitting feed pressure 23 and are then pressed into the flesh of the vegetables to be sliced to hold them more securely; at the same time, the extractor rod 20 rises in the direction of arrow B, compressing the spring 26 in the process, until compression is complete.

As shown in FIG. 6, the user must then move the carriage assembly consisting of the guide chamber 2 and the press-down cap 3 in translation to and fro along the frame 1 in the directions showing by double arrow C so that the vegetables are sliced by the transverse blade 9, 9'.

In the course of this movement, the spring 26 constantly presses down on the disc transmitting feed pressure 22 which presses the vegetables to be sliced against the transverse blade 9, 9' so that they can be sliced.

As the level of vegetables in the loading volume 17 of the guide chamber 2 decreases, the needles 29 are withdrawn from the vegetables.

At the end of the cut, the ergonomic press-down cap body 18 is resting against the body 14 of the guide chamber 2, in the position shown in FIG. 12.

It should be noted that the disc transmitting feed pressure 22 cannot move down to the level of the transverse blade 9, 9' since its translational motion is stopped before this by the plug 25.

As shown in FIGS. 14 and 15, the cutting depth adjustment ramp 10 consists of a centre plate 31 equipped on either side with two side flanges 32, 32' substantially perpendicular to the plate and serving to lock the ramp 10 onto the side uprights 6, 7 of the frame 1.

Figure 16:
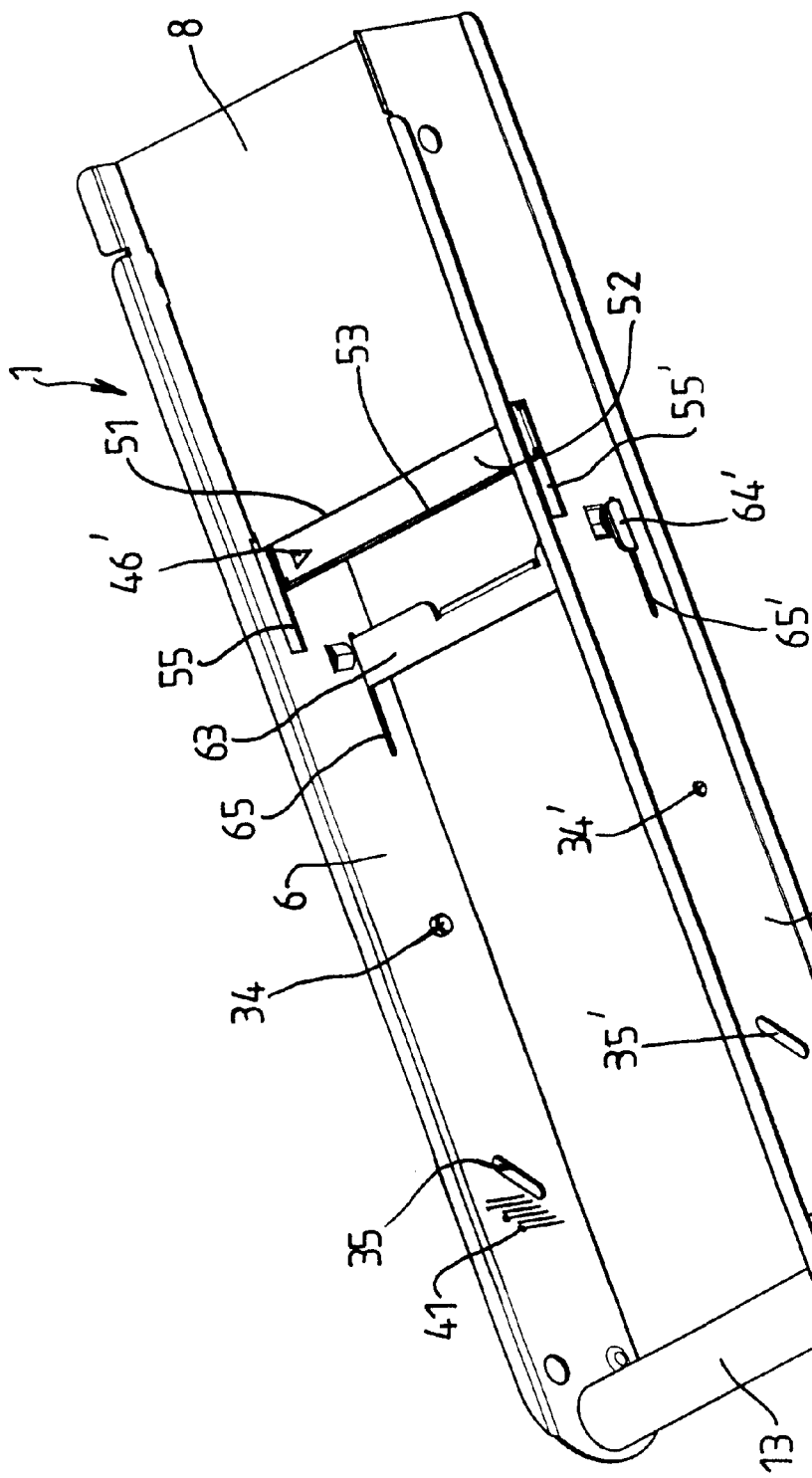
FIG. 16 is a detailed perspective view of the upper part of the frame
Figure 17:
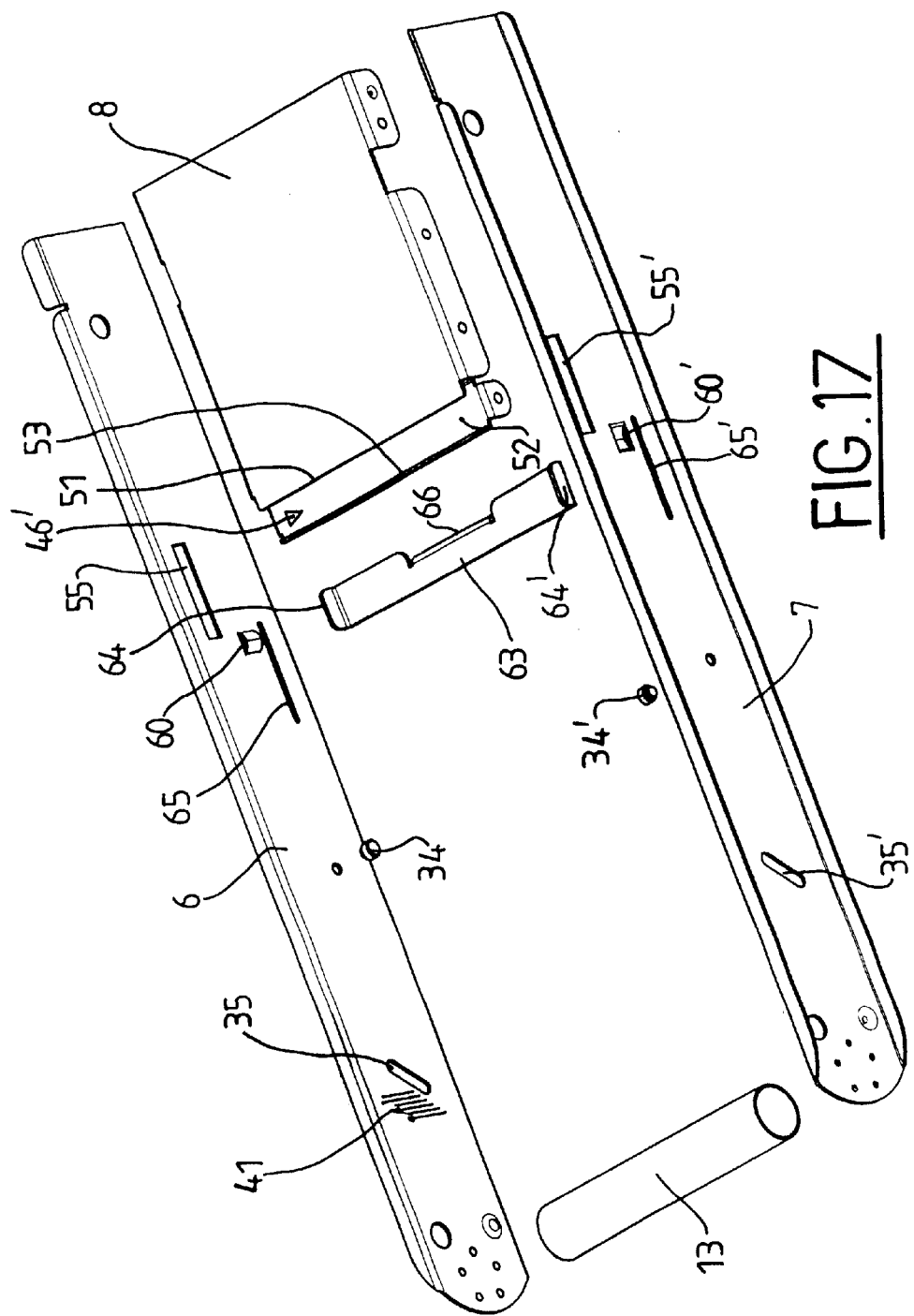
FIG. 17 is an exploded view corresponding to FIG. 16

For this purpose, the side flanges 32, 32' of the ramp 10 are provided with oblong holes 33, 33' aligned obliquely, and fitting into these are pegs 34, 34' projecting from the inside faces of the side uprights 6, 7 of the frame 1, as shown in FIGS. 16 and 17.

The side uprights 6, 7 of the frame 1 also have oblong holes 35, 35' aligned obliquely which are similar to the oblong holes 33, 33' in the cutting depth guide ramp 10.

The oblong holes 35, 35' in the frame 1 are positioned to line up with and act in conjunction with circular openings 36, 36' in the side flanges 32, 32' of the cutting depth guide ramp 10 shown in FIG. 14, and passing through these are locking screws 37, 37' for locking the ramp 10 in a given position by means of nuts 38.

The oblong openings 33, 33' in the cutting depth adjustment ramp 10 extend to the level of the centre plate 31 of this ramp 10 and are dimensioned to allow the pegs 34, 34' to pass through so that the ramp 10 can be completely dismantled after removing the locking screws 37, 37' and the nuts 38.

Figure 18:
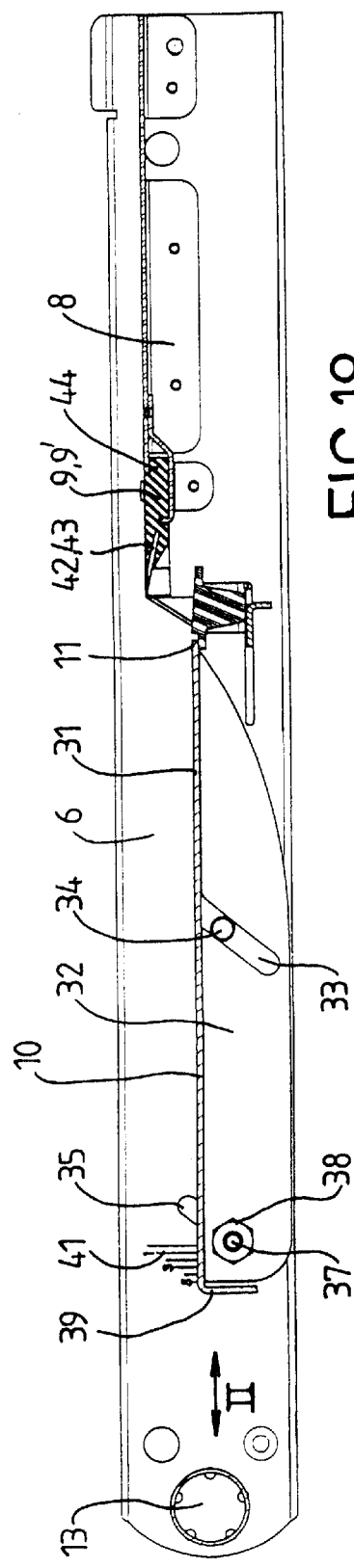
FIG. 18 is a lengthways sectional view of the frame showing the cutting depth adjustment ramp in the low position
Figure 19:
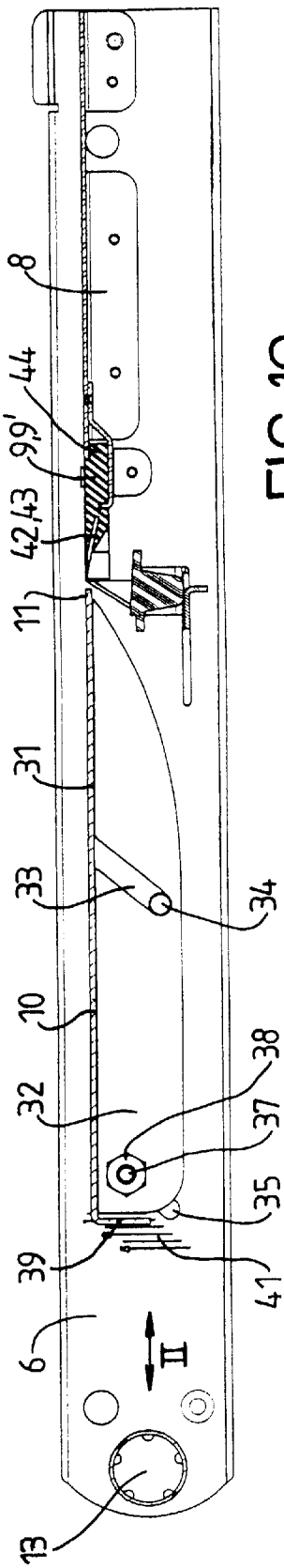
FIG. 19 is a lengthways sectional view of the frame showing the cutting depth adjustment ramp in the high position

As shown in FIGS. 18 to 21, the geometry of the oblong holes 33 and 33' and also 35 and 35' is selected so that the position of the cutting depth adjustment ramp 10 can be altered by moving it in translation parallel to the cutting plane as indicated by arrow I in FIGS. 20 and 21 between a low position shown in FIGS. 18 and 20 and a high position shown in FIGS. 19 and 21, in such a way that the first end 11 of this ramp 10 is always located at a constant short distance from the transverse blade 9, 9'.

The first end 11 of the ramp 10 thus moves in a trajectory shown by dotted lines in FIGS. 20 and 21.

To carry out this adjustment of the ramp 10, the user must loosen the locking screws 37, 37' and nuts 38, and push or pull the ramp as indicated by double arrow II in FIGS. 18 and 19, doing this by taking hold of a hand grip 39 provided for the purpose at the second end 40 of the ramp 10 opposite the first end 11 which is positioned facing the transverse cutting blade 9, 9'.

As shown in FIGS. 16, 17, 18 and 19, a graduated scale 41 marked on the inner face of the side uprights 6, 7 of the frame 1 provide the user with an indication of the level of the ramp 10.

Of course, when the ramp 10 has been adjusted, the user must lock it by means of the locking screws 37 and 37' and nuts 38 before beginning the slicing operation.

Moreover, as shown in FIGS. 22 to 25, the vegetable cutter is equipped with two removable and interchangeable transverse blades which can be selectively fitted to the frame 1 facing the first end 11 of the cutting depth adjustment ramp 10, namely a first transverse blade 9 fitted with a straight cutting edge 42 shown in FIGS. 22 and 23 and also a second transverse blade 9' having a corrugated cutting edge 43 which is shown in FIGS. 24 and 25.

As shown in FIGS. 20 and 21, these blades 9, 9' both consist of a body of a man-made or metal material 44 into which the cutting portion 42 or 43 is inserted.

As shown in FIGS. 22 to 25, the body of a man-made or metal material 44 is extended to form a handling grip 45 allowing the user to take hold of the blades 9, 9' without touching the cutting portion 42 or 43, and is provided on a first face 47 with a positioning mark or device ensuring correct location 46 corresponding to a similar positioning mark or device 46' provided on the frame 1 so as to guarantee that the blade 9, 9' is always inserted the right way round in the frame 1.

The first face 47 of the body of a man-made or metal material 44 is also equipped with a snap fitting device 49 holding it in the frame 1 and also with a step 50 to guide the blade 9, 9' when it is inserted into the frame.

As for the second face 48 of the body of a man-made or metal material 44, this is equipped with a guide groove 54 in the centre.

As shown in FIGS. 16, 17, 20 and 21, the spacer 8 of the frame 1 is provided at its end 51 positioned facing the first end 11 of the cutting depth adjustment ramp 10 with a guide strip 52 for the transverse blade 9, 9', the free end 53 of which is bent to form a guide rib which acts in conjunction with the guide groove 54 in the body of a man-made or metal material 44 of the transverse blades 9, 9'.

In a similar way, the end 51 of the spacer 8 acts in conjunction with the guide step 50 on the body of a manmade or metal material 44 of the transverse blades 9, 9' to complete the guidance of these blades when they are installed in or removed from the frame 1.

Openings 55, 55' provided in the side uprights 6, 7 of the frame 1 permit these insertion and removal operations as shown in FIGS. 16 and 17.

The positioning of a transverse blade 9, 9' in the frame 1 is thus particularly quick and easy: in fact, the blade only has to be inserted through the opening 55 in the upright 6 and slid along the guide strip 52 so that it is automatically guided by components 51, 53 until, once fully home, it passes through the opening 55' in the upright 7 and is held in position by the snap-in device 49.

As shown in FIGS. 20, 21, 26 and 27, the vegetable cutter is also equipped with a lengthwise cutter blade 56 acting in conjunction with the transverse blade 9, 9' to cut the vegetables into sticks.

This cutter 56 consists of a body of a man-made or metal material 57 equipped with a set of equidistant blades 58 aligned substantially at right angles to the cutting edge 42, 43 of the transverse blades 9, 9' and at its ends has recesses 59, 59' acting in conjunction with corresponding projections 60, 60' provided on the inner face of the side uprights 6, 7 of the frame 1.

The cutter 56 can thus be held by snapping into place between the uprights 6, 7.

The recesses 59, 59' and also the projections 60, 60' are asymmetrical to ensure that the blade 56 is always fitted the right way round.

As shown in FIGS. 26 and 27, the body of a man-made or metal material 57 of the cutter 58 includes two ergonomically shaped notches 61, 61' acting in conjunction with projections 62, 62' which provide a stop for the user's fingers to avoid slipping towards the blades 58 when inserting the cutter into the frame 1.

Figure 28:
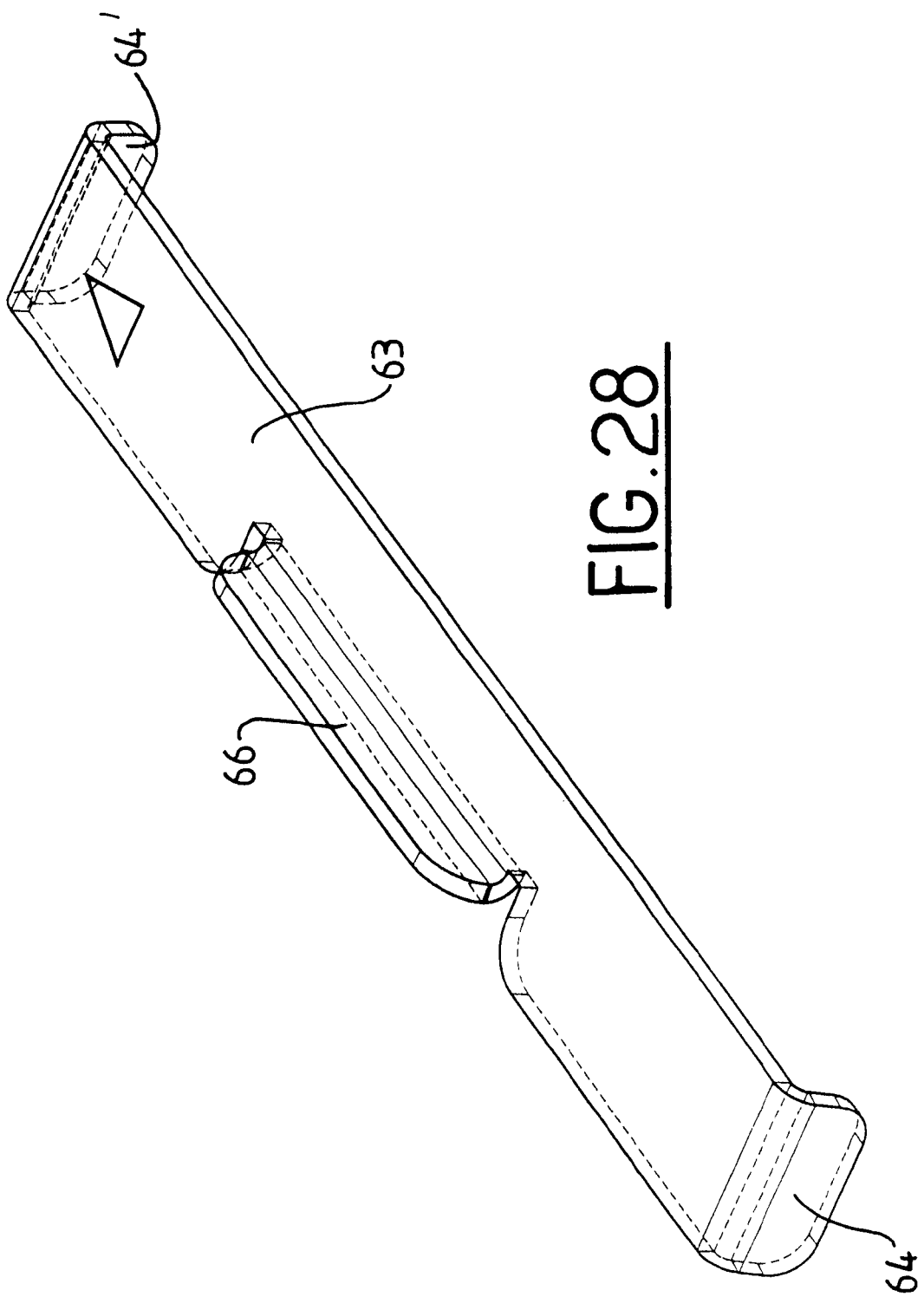
FIG. 28 is a perspective view of the cutter blade locking bar.

As shown in FIGS. 16, 17 and 28, a transverse locking bar 63 capable of translational motion between the side uprights 6, 7 holds the cutter blade 56 in the frame 1.

For this purpose, the bar 63 has two side tabs 64, 64' inserted into the slots 65, 65' provided on the side uprights 6 and 7.

The bar 63 is also equipped in its centre portion with a projecting part 66 by which the user can grip it to slide it into slots 65, 65' in order to install the cutter blade 56 in the frame 1 or remove it.

What is claimed is:

1. A safety manual vegetable cutter comprising a frame (1) equipped with at least one cutting blade (9, 9') fitted transversely facing a slot (12) through which sliced vegetables pass and also two side rails (6_1, 7_1) to provide guidance in a to-and-fro translational motion for a guide chamber (2) equipped with a loading volume (17) in the guide chamber (2) for vegetables to be sliced and acting in conjunction with a press-down can (3) designed to be gripped by a user to move the guide chamber (2) to and fro along the guide rails (6_1, 7_1) while exerting a constant pressure on the vegetables contained in the loading volume (17) so as to press them against the at least one cutting blade (9, 9') fitted to the frame (1) and enable them to be sliced by the at least one cutting blade (9, 9'), wherein the press-down cap (3) comprises a hollow ergonomic press-down cap body (18) fitting onto the guide chamber (2) so as to form an assembly integral with the frame (1) in translation and also an extractor (19) consisting of an extractor rod (20) capable of translational motion on the inside of the ergonomic press-down cap body (18) and a first end (21) of which projects from this press-down cap body (18) through a guide opening (24) in it, and also of a plate transmitting feed pressure (22) attached to the second end of the extractor rod (20) so that the vegetables to be sliced are pressed against the at one cutting blade fitted to the frame (1) when the assembly is moved.

2. A vegetable cutter according to claim 1, wherein the press-down cap (3) includes a spring (26) fitted around the extractor rod (20) and bearing against the ergonomic press-down cap body (18) on the inside at a first end, and against the feed pressure plate (22) at a second end, the spring (26) tending to press the feed plate (22) against ramp (10) in the absence of any external force applied to it.

3. A vegetable cutter according to claim 1, wherein the frame (1) comprises two parallel side uprights (6, 7) connected by a transverse operating handle (13) the uprights forming guide rails (6_1, 7_1) for the guide chamber.

4. A vegetable cutter according to claim 1, wherein the frame (1) comprises two parallel side uprights (6, 7) connected by a transverse operating handle (13) the uprights forming guide rails (6_1, 7_1) for the guide chamber.

5. A vegetable cutter according to claim 1, wherein the guide chamber (2) is fitted so as to be integral with the frame (1) by means of slides.

6. A vegetable cutter according to claim 1, as wherein it stands on at least one foot (4, 5).

7. A vegetable cutter according to claim 1, further comprising at least two removable and interchangeable transverse blades (9, 9') which are selectively positioned and snapped into place in the frame (1), one of these blades (9) being equipped with a straight cutting edge (42) while the other (9') is equipped with a corrugated cutting edge (43).

8. A vegetable cutter according to claim 1, further comprising at least one removable lengthwise cutter blade (56) equipped with a set of equidistant blades (58) aligned substantially at right angles to at least two removable and interchangeable transverse blades (9, 9') 50 as to enable vegetables to be cut into sticks.

9. A vegetable cutter according to claim 1, wherein the ergonomic press-down cap body (18) is equipped with needles (19) attached to its inside and are designed to be pushed into the vegetables to be sliced.

10. A vegetable cutter according to claim 9, wherein the frame (1) comprises two parallel side uprights (6, 7) connected by a transverse operating handle (13) the uprights forming guide rails (6_1, 7_1) for the guide chamber.

11. A vegetable cutter according to claim 1, further comprising means for adjusting the dept of cut.

12. A vegetable cutter according to claim 11, wherein the means for adjusting the depth of cut include a ramp (10) fitted so as to be capable of translational motion parallel to the cutting plane and facing the at least one cutting blade at a first end (11) to form the slot (12) through which the sliced vegetables pass.

13. A vegetable cutter according to claim 11, further comprising means for keeping a first end (11) of a cutting depth adjustment ramp (10) at a constant short distance from the at least one cutting blade (9, 9').

14. A vegetable cutter according to claim 11, herein the means far adjusting the depth of cut include a ramp (10) fitted so as to be capable of translational motion parallel to a cutting plane and facing the at least one cutting blade (9, 9') at a first end (11) to form the slot (12) through which the sliced vegetables pass.

15. A vegetable cutter according to claim 14, further comprising means for keeping a first end (11) of the cutting depth adjustment ramp (10) at a constant shot distance from the at least one cutting blade (9, 9').

* * * * *